United States Patent [19]
Ishizawa

[11] Patent Number: 5,905,405
[45] Date of Patent: May 18, 1999

[54] QUADRATURE DEMODULATION CIRCUIT WITH CARRIER CONTROL LOOP

[75] Inventor: Yoshiro Ishizawa, Tokyo, Japan

[73] Assignee: NEC Corporation, Tokyo, Japan

[21] Appl. No.: 08/908,069

[22] Filed: Aug. 11, 1997

[30] Foreign Application Priority Data

Aug. 9, 1996 [JP] Japan .................................. 8-227836

[51] Int. Cl.$^6$ .............................. H03K 9/00; H04L 27/06
[52] U.S. Cl. .......................... 329/308; 329/306; 375/324; 375/326; 375/344
[58] Field of Search .............................. 331/12; 375/324, 375/326, 327, 328, 294, 346, 293, 344; 329/306, 307, 308, 309

[56] References Cited

FOREIGN PATENT DOCUMENTS 2-150145  6/1990  Japan .

Primary Examiner—Arnold Kinkead
Attorney, Agent, or Firm—Whitham, Curtis & Whitham

[57] ABSTRACT

In a quadrature circuit, when a large frequency variation is detected, the carrier reproduction is conducted by using the carrier reproduction loop having a signal distortion but a small delay, and then, if the reproduced carrier becomes stable at some degree, the carrier reproduction is conducted by using the carrier reproduction loop having a less signal distortion but a large delay. When the number of the errors detected by an error detecting and correcting circuit is larger than a predetermined value, a selector supplies a digital in-phase signal and a digital quadrature signal outputted from A/D converters located before a waveform equalizer, to a carrier phase error detecting circuit which generates a digital phase error signal feedback through a D/A converter to a local carrier oscillator. When the number of errors detected by the error detecting/correcting circuit is not larger than the predetermined value, the selector supplies a digital in-phase demodulated signal and a digital quadrature demodulated signal outputted from the waveform equalizer to the carrier phase error detecting circuit.

5 Claims, 5 Drawing Sheets

QUADRATURE DEMODULATION CIRCUIT WITH CARRIER CONTROL LOOP

BACKGROUND OF THE INVENTION

1. Field of the Invention

The present invention relates to a multilevel QAM (quadrature amplitude modulation) demodulation circuit, and more specifically to a carrier reproduction control loop circuit for a local carrier oscillator for demodulation.

2. Description of Related Art

A multilevel QAM transmission system, which is one of digital transmission systems, has been well known in the field of a microwave radio communication from the past. Recently, attention has been paid to a bi-directional TV, an internet distribution using a cable modem, etc., and the multilevel QAM transmission system is being studied as the technology for transferring a large amount of digital data in the field of a cable transmission.

In the multilevel QAM transmission system in the field of the radio communication, a major problem is how to compensate for transmission distortion caused by a channel characteristics variation attributable to various factors including meteorological conditions. However, since communication is based on a fixed channel in one-to-one relation, a problem of the transmission distortion caused by reflection and another problem of the channel switch-over could not have become a major problem.

In a cable transmission, however, the transmission channel characteristics depends upon a construction of the transmission channel, and therefore, the degree of transmission distortion does not change almost. On the other hand, since the cable transmission is fundamentally based on a one-to-multipoint transmission, the transmission distortion is caused by reflection in a transmission cable. In addition, since it is necessary to conduct the transmission while switching over from one channel to another, a quickness of synchronism detection after a frequently occurring channel switch-over becomes an important problem. In the other words, the problems which were not the major problems in the radio transmission, have becomes the major problems in the cable transmission.

On the other hand, in order to reduce the cost of apparatuses, research is required to construct a roll-off filter into a digital LSI circuit, in place of a conventional analog SAW (surface acoustic wave) filter.

Referring to FIG. 1, there is shown a block diagram illustrating a construction of a conventional quadrature demodulation circuit used in a conventional multilevel QAM demodulation system and using a digital roll-off filter.

As shown in FIG. 1, the conventional quadrature demodulation circuit is so constructed that, an intermediate frequency signal (abbreviated to an "IF signal" hereinafter) (multilevel QAM signal) supplied to a signal input terminal 1, is divided into two signals, namely, a first IF signal and a second IF signal. The first IF signal is supplied to a mixer 3 where the input signal is multiplied with an in-phase (equiphase or same-phase) local carrier which is reproduced in a voltage controlled local carrier oscillator (abbreviated to a "VCO" hereinafter) 5, and the mixed signal is supplied through a low pass filter (abbreviated to a "LPF") 20 for the purpose of eliminating surplus high frequency components, so that an in-phase signal I is obtained. On the other hand, the second IF signal is supplied to a mixer 4 where the second IF signal is multiplied with a quadrature local carrier which is obtained by supplying the local carrier reproduced in the VCO 5, into a 90° phase shifter 6, and the output of the mixer 4 is supplied to the a low pass filter 21 for the purpose of eliminating surplus high frequency components, so that a quadrature signal Q is obtained.

The in-phase signal I and the quadrature signal Q are supplied to an analog to digital (A/D) converters 7 and 8, respectively, so that the analog in-phase signal I and the analog quadrature signal Q are converted into a digital in-phase signal ID and a digital quadrature signal QD, respectively. The digital in-phase signal ID and the digital quadrature signal QD are supplied through roll-off filters 9 and 10, respectively, to a waveform equalizer 12, in which these signals are subjected to a waveform equalizing processing, and then, converted into an in-phase demodulation signal IMD and a quadrature demodulation signal QMD, respectively.

The in-phase demodulation signal IMD and the quadrature demodulation signal QMD, obtained from the waveform equalizer 12, are converted by a code conversion circuit 16, and then, an error detection/correction is conducted by an error detection/correction circuit 17, so that an error corrected signal is outputted through a data output terminal 18.

Furthermore, the in-phase demodulation signal IMD and the quadrature demodulation signal QMD are fed back to a carrier phase error detection circuit 11, in which a carrier phase error is detected, and an error signal is fed back through a digital to analog (D/A) converter 19 to the VCO 5, so that the VCO 5 reproduces the local carrier having a correct frequency and phase. Thus, a control loop is constituted.

Here, the conventional carrier phase error detection is conducted by using the outputs of the waveform equalizer 12. The reason for this is that: If the carrier phase error detection was conducted by using the signals which have not yet been subjected to the waveform equalizing processing, since the signals includes the transmission distortion, the carrier phase error detection circuit 11 mis-discriminates the transmission distortion as the phase error to change the control voltage supplied to the VCO 5, with the result that the local carrier rather becomes unstable.

However, when the roll-off filters 9 and 10, which were constructed of the analog SAW filter in the prior art, are constituted of a digital circuit, the roll-off filters 9 and 10 are put after the A/D converters 7 and 8 as shown in FIG. 1. In this case, in order to obtain a desired characteristics, the roll-off filter must have a number of taps, with the result that the carrier recovery or reproduction loop delay becomes large.

In order to realize a stable carrier reproduction, for example, Japanese Patent Application Pre-examination Publication No. JP-A-02-150145, (an English abstract of which is available from the Japanese Patent Office, and the content of the English abstract of JP-A-02-150145 is incorporated by reference in its entirety into this application) proposes a multilevel QAM transmission system for a multiplex digital radio transmission, which is configured to adaptively switch over one signal channel to another in accordance with the degree of stability in frequency.

Referring to FIG. 2, there is shown a block diagram illustrating the construction of the quadrature demodulation circuit used in the multilevel QAM transmission system proposed by JP-A-02-150145. In FIG. 2, elements similar or corresponding to those shown in FIG. 1 are given the same Reference Numerals, and explanation thereof will be omitted.

As seen from comparison between FIGS. 1 and 2, the carrier phase error detection circuit 11 shown in FIG. 1 is replaced with a carrier phase error detection circuit 30, which comprises a control circuit 301 receiving a pair of input signals of the waveform equalizer 12 for generating a phase error signal, another control circuit 302 receiving the in-phase demodulation signal IMD and the quadrature demodulation signal QMD outputted from the waveform equalizer 12, for generating a phase error signal, a selector 303 receiving the phase error signal generated by the control circuit 301 and the phase error signal generated by the control circuit 301, a comparator 304 comparing the phase error signal generated by the control circuit 301 with the phase error signal generated by the control circuit 301, for generating a control signal for the selector 303, and a loop filter 305 receiving an output of the selector 303 for filtering the received signal to output the filtered signal to the D/A converter 19. In addition, the error detection/correction circuit 17 is not provided in the circuit shown in FIG. 2, but this is not an essential difference.

In the circuit shown in FIG. 2, the phase error signal (or control result) obtained from the input signals of the waveform equalizer 12 is compared with the phase error signal (or control result) obtained from the output signals of the waveform equalizer 12. Here, it is considered that, if both are consistent, it is called a "stationary time", and if both are not consistent, it is called an "unstationary time", namely, in a condition in which since the transmission distortion occurs, the waveform equalizing processing is conducted in the waveform equalizer 12. Therefore, at the stationary time, a control loop having a small delay is constituted by using the input signals of the waveform equalizer 12, and at the unstationary time, a control loop having a large delay is constituted by using the output signals of the waveform equalizer 12. As a result, since the control loop having the small delay is used at the stationary time, it is possible to provide a circuit having a fast response to frequency variation.

In the cable transmission, however, the transmission channel characteristics is determined by fixed factors including the structure of the transmission channel, not by variable factors such as meteorological conditions. Therefore, the transmission channel of a bad condition remains bad indefinitely, so that the control loop having the large delay is constituted always.

In addition, when the channel is switched over, the control loop becomes the control loop having the large delay, and therefore, the delay time is not improved until the synchronism becomes stable.

Furthermore, since the roll-off filter is included both in the control loop having the large delay and in the control loop having the small delay, the loop delay cannot be shortened.

As mentioned above, in the conventional quadrature demodulation circuit, since the roll-off filter and the waveform equalizer are included in the carrier reproduction loop, the response to the frequency variation is low. Therefore, when the channel is switched over, it is not possible to quickly responds to the frequency change, and therefore, a substantial time is required, until the synchronism becomes stable.

The reason for this is considered as follows: In the conventional quadrature demodulation circuit, if the roll-off filter, which was constructed of the analog SAW filter in the prior art, is digitized and internally provided in a demodulation IC for the purpose of reduce the cost, it is necessary to provide a number of taps in order to obtain a desired characteristics, with the result that the loop delay becomes large.

In the multilevel QAM transmission system, the waveform equalizer is indispensable to compensate for the waveform distortion. In applications including CATV (cable television), the waveform equalizer inevitably has an increased number of taps, and therefore, the loop delay becomes further large.

SUMMARY OF THE INVENTION

Accordingly, it is an object of the present invention to provide a quadrature demodulation circuit which has overcome the above mentioned defect of the conventional one.

Another object of the present invention is to provide a multilevel QAM demodulation circuit which internally includes a roll-off filter and which is capable of quickly obtaining the synchronism at a frequency variation time, in particular, when a large, frequency variation occurs due to the channel switch-over.

The above and other objects of the present invention are achieved in accordance with the present invention by a quadrature demodulation circuit comprising an input terminal receiving a multilevel QAM signal, a local carrier oscillating means for generating a local carrier, a first mixing means multiplying the multilevel QAM signal by the local carrier to generate an analog in-phase signal, a second mixing means multiplying the multilevel QAM signal by a 90° phase-shifted signal of the local carrier to generate an analog quadrature signal, a first A/D converting means receiving the analog in-phase signal for generating a digital in-phase signal, a second A/D converting means receiving the analog quadrature signal for generating a digital quadrature signal, a waveform equalizing means for waveform-equalizing the digital in-phase signal and the digital quadrature signal after conducting a low pass filtering, to generate a digital in-phase demodulated signal and a digital quadrature demodulated signal, a code converting means for code-converting the digital in-phase demodulated signal and the digital quadrature demodulated signal, an error detecting/correcting means for conducting an error detection/correction to an output of the code converting means, and a carrier reproduction control loop for controlling the local carrier oscillating means, the carrier reproduction control loop including a carrier phase error detecting means generating a digital phase error signal, a D/A converting means receiving and converting the digital phase error signal into an analog phase error signal which is fed back to the local carrier oscillating means, and selection means receiving the digital in-phase signal and the digital quadrature signal and the digital in-phase demodulated signal and the digital quadrature demodulated signal, the selection means being controlled on the basis of an output of the error detecting/correcting means to supply the digital in-phase signal and the digital quadrature signal to the carrier phase error detecting means when the output of the error detecting/correcting means indicates a first condition and to supply the digital in-phase demodulated signal and the digital quadrature demodulated signal to the carrier phase error detecting means when the output of the error detecting/correcting means indicates a second condition.

In one embodiment, when the number of the errors detected by the error detecting/correcting means is larger than a predetermined value, the selection means supplies the digital in-phase signal and the digital quadrature signal to the carrier phase error detecting means, and when the number of the errors detected by the error detecting/correcting means is not larger than the predetermined value, the selection means supplies the digital in-phase demodulated signal and the digital quadrature demodulated signal to the carrier phase error detecting means.

In another embodiment, when the number of the out-of-synchronisms detected by the error detecting/correcting means is larger an a predetermined value, the selection means supplies the digital in-phase signal and the digital quadrature signal to the carrier phase error detecting means, and when the number of the out-of-synchronisms detected by the error detecting/correcting means is not larger than the predetermined value, the selection means supplies the digital in-phase demodulated signal and the digital quadrature demodulated signal to the carrier phase error detecting means.

With the above mentioned arrangement, a large frequency variation caused by a channel switch-over is discriminated by whether or not the number of errors or the number out-of-synchronisms detected by the error detecting/correcting means exceeds the predetermined value. If it exceeds the predetermined value, the input signal supplied to the carrier phase error detecting means is switched from the output of the waveform equalizer having a large loop delay, to the output of the A/D converting means having a small loop delay. Thus, the carrier reproduction is quickly conducted. If the synchronism becomes stable at some degree, and therefore, the number of errors or the number out-of-synchronisms detected by the error detecting/correcting means becomes not exceeding the predetermined value, the output of the waveform equalizer having a large loop delay, is supplied to the carrier phase error detecting means. Thus, a stable carrier reproduction can be obtained.

The above and other objects, features and advantages of the present invention will be apparent from the following description of preferred embodiments of the invention with reference to the accompanying drawings.

DESCRIPTION OF THE PREFERRED EMBODIMENTS

Figure 1:
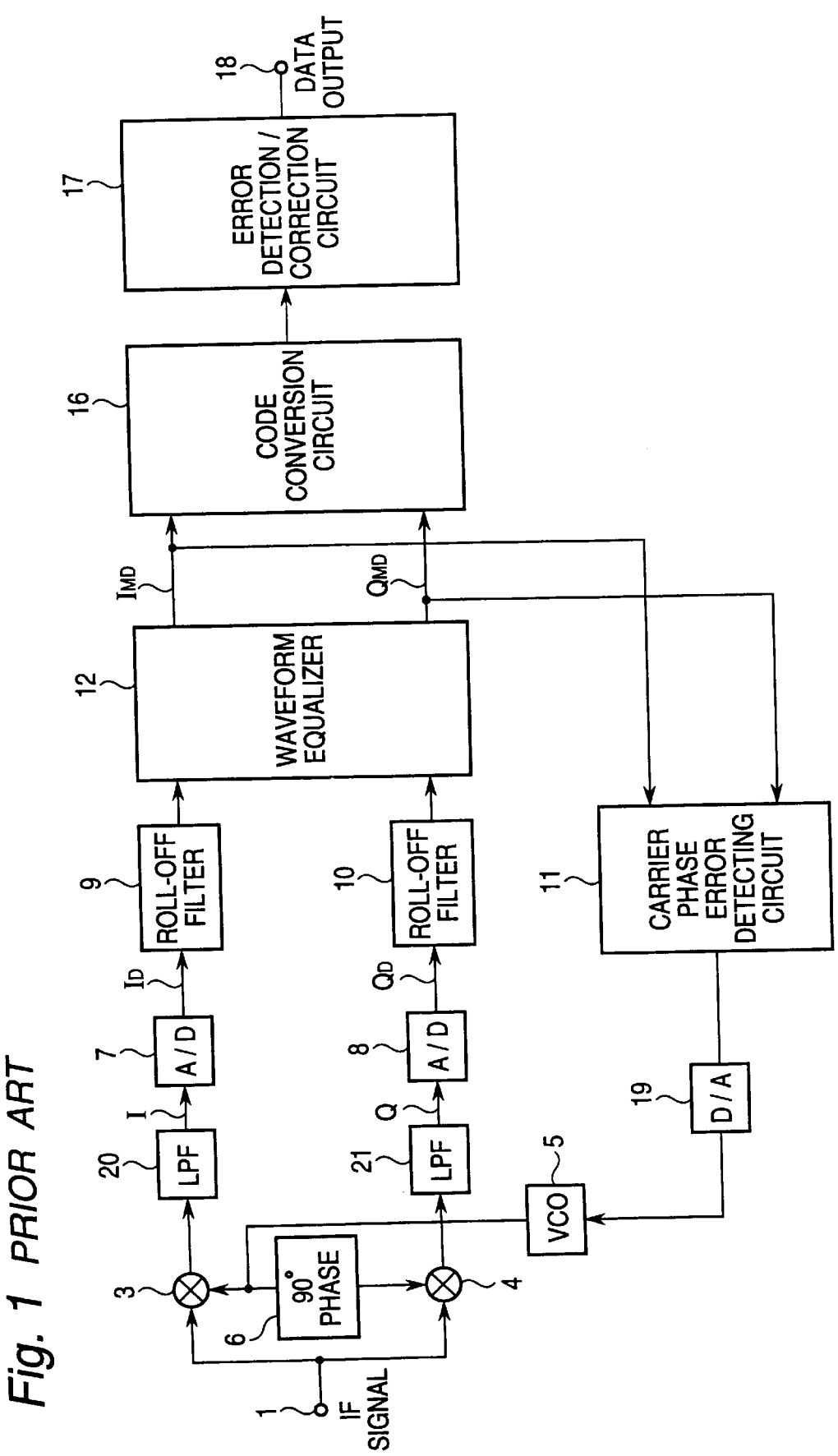
FIG. 1 is a block diagram illustrating a construction of a conventional quadrature demodulation circuit used in a conventional multilevel QAM demodulation system and using a digital roll-off filter.
Figure 2:
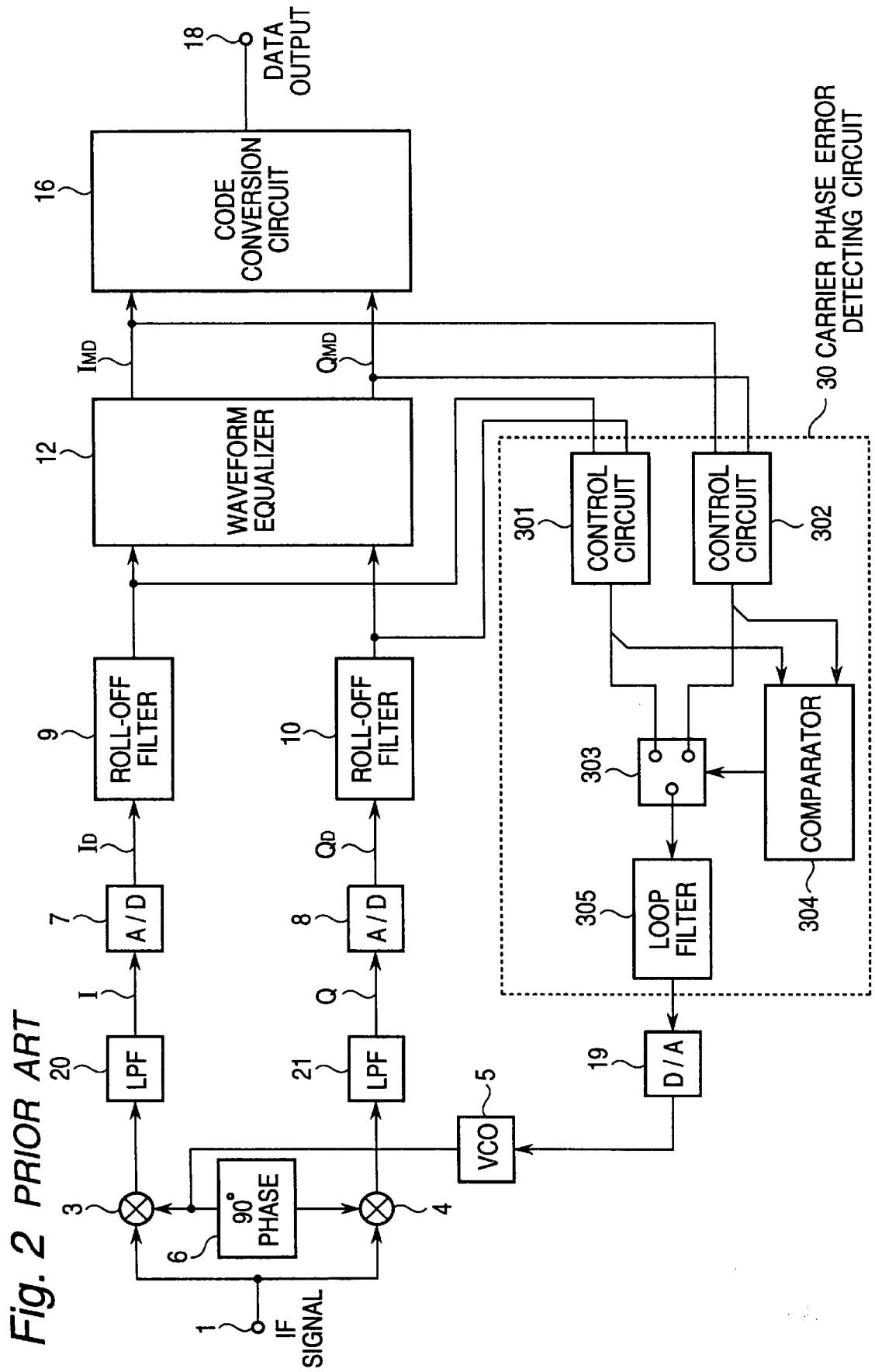
FIG. 2 is a block diagram illustrating a construction of another conventional quadrature demodulation circuit used in another conventional multilevel QAM demodulation system and using a digital roll-off filter.
Figure 3:
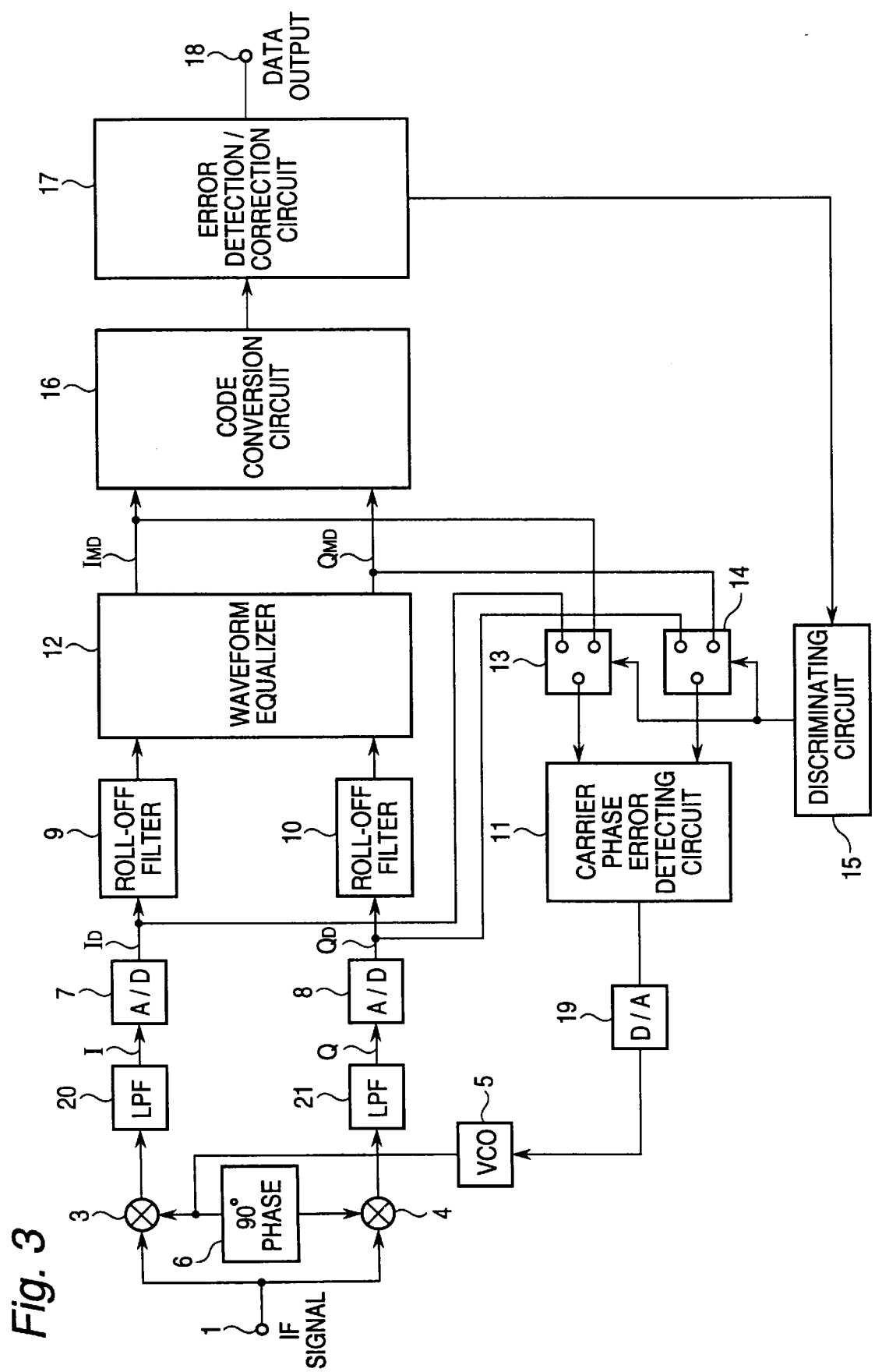
FIG. 3 is a block diagram illustrating a basic construction of the multilevel QAM demodulation circuit in accordance with the present invention.

Referring to FIG. 3, there is shown a block diagram illustrating a basic construction of the multilevel QAM demodulation circuit in accordance with the present invention. In FIG. 3, elements similar or corresponding to those shown in FIG. 1 are given the same Reference Numerals.

An IF signal (multilevel QAM signal) supplied to a signal input terminal 1, is branched into two signals, namely, a first IF signal and a second IF signal. The first IF signal is supplied to a mixer 3 where the input IF signal is multiplied with an in-phase (equiphase or same-phase) local carrier which is reproduced in a voltage controlled local carrier oscillator ("VCO") 5, (input signal multiplication detection) and the mixed or detected signal is supplied through a low pass filter ("LPF") 20 for the purpose of eliminating surplus high frequency components, so that an analog in-phase signal I is obtained. On the other hand, the second IF signal is supplied to a mixer 4 where the second IF signal is multiplied with a quadrature local carrier which is obtained by supplying the local carrier reproduced in the VCO 5, into a 90° phase shifter 6, (input signal multiplication detection) and the output of the mixer 4 is supplied to a low pass filter 21 for the purpose of eliminating surplus high frequency components, so that an analog quadrature signal Q is obtained.

The analog in-phase signal I and the analog quadrature signal Q are supplied to an A/D converters 7 and 8, respectively, so that the analog in-phase signal I and the analog quadrature signal Q are converted into a digital in-phase signal ID and a digital quadrature signal QD, respectively. The digital in-phase signal ID and the digital quadrature signal QD are supplied through roll-off filters (low pass filters) 9 and 10, respectively, to a waveform equalizer 12, in which these signals are subjected to a waveform equalizing processing, and then, converted into an in-phase demodulation signal IMD and a quadrature demodulation signal QMD, respectively.

The in-phase demodulation signal IMD and the quadrature demodulation signal QMD, obtained from the waveform equalizer 12, are converted by a code conversion circuit 16, and then, an error detection/correction is conducted by an error detection/correction circuit 17, so that an error-corrected signal is outputted through a data output terminal 18. At the same time, the number of errors is detected.

Furthermore, either the in-phase demodulation signal IMD and the quadrature demodulation signal QMD, outputted from the waveform equalizer 12, or the digital in-phase signal ID and the digital quadrature signal QD, outputted from the A/D converters 7 and 8, are fed back through selectors 13 and 24, respectively, to a carrier phase error detection circuit 11, in which a carrier phase error is detected, and an error signal is fed back through a D/A converter 19 to the VCO 5, so that the VCO 5 reproduces the local carrier having a correct frequency and phase. Thus, a carrier recovery or reproduction control loop is constituted.

In brief, the selector 13 receives the in-phase demodulation signal IMD outputted from the waveform equalizer 12 and the digital in-phase signal ID outputted from the A/D converter 7. The selector 14 receives the quadrature demodulation signal QMD outputted from the waveform equalizer 12 and the digital quadrature signal QD outputted from the A/D converter 8. The selectors 13 and 14 are controlled by a discriminating circuit 15 connected to the error detection/correction circuit 17 for discriminating whether or not the number of errors detected in the error detection/correction circuit 17 is large.

Now, operation of the first embodiment will be described.

When a large frequency variation occurs due to the channel switch-over or other causes, the error detection/correction circuit 17 detects a large amount of errors. Therefore, it is possible to detect which the frequency variation is, large or small, on the basis of the number of the errors detected, namely, on the basis of which the errors detected are, much or little.

In the embodiment shown in FIG. 3, the discriminating circuit 15 discriminates whether or not the number of errors detected by the error detection/correction circuit 17 exceeds a predetermined threshold value, and controls the selectors 13 and 14 in such a manner that, when the number of errors detected by the error detection/correction circuit 17 exceeds the predetermined threshold value, the selectors 13 and 14 select the digital in-phase signal ID outputted from the A/D converter 7 and the digital quadrature signal QD outputted from the A/D converter 8, respectively, and in the other cases, namely, when the number of errors detected by the error detection/correction circuit 17 does not exceed the predetermined threshold value, the selectors 13 and 14 select the in-phase demodulation signal IMD outputted from the waveform equalizer 12 and the quadrature demodulation signal QMD outputted from the waveform equalizer 12, respectively.

With this arrangement, when the frequency variation is large and therefore when the number of the errors detected is large, the local carrier frequency is caused to be shifted to a value near to the new frequency, by using the local carrier reproduction control loop having a large signal distortion but a small delay and therefore a quick response, and thereafter, when the frequency variation or frequency error has become small, and therefore when the number of the errors detected has become small, the control loop is constituted of the loop having a small signal distortion but a large delay, by using the waveform-equalized signals. Thus, a stable loop can be constructed.

Figure 4:
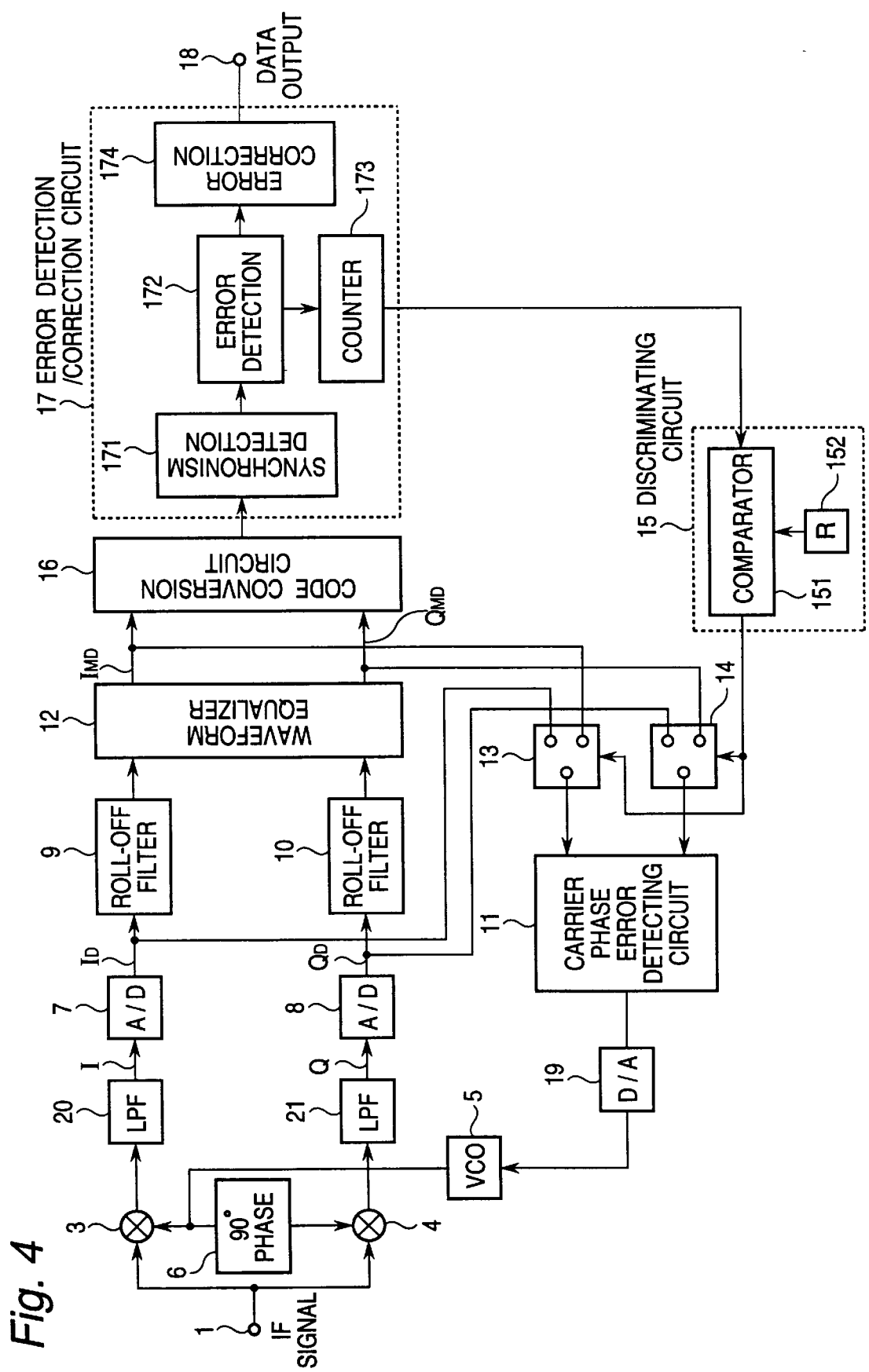
FIG. 4 is a block diagram illustrating a construction of a first embodiment of the multilevel QAM demodulation circuit in accordance with the present invention.

Referring to FIG. 4, there is shown a block diagram illustrating a construction of a first embodiment of the multilevel QAM demodulation circuit in accordance with the present invention. In FIG. 4, elements similar or corresponding to those shown in FIG. 3 are given the same Reference Numerals, and explanation thereof will be omitted for simplification of description.

The error detection/correction circuit 17 includes a synchronism detector 171 receiving an output of the code conversion circuit 16 to detect synchronism in the received signal and to generate an out-of-sync signal when the synchronism is not detected, an error detection circuit 172 for detecting an error in the signal after the synchronism detection, to generate an error detection flag when the error is detected, a counter 173 for counting the error detection flag generated in the error detection circuit 172, and an error correction circuit 174 coupled to the error detection circuit 172 for conducting the error correction. The count value of the counter 173 is outputted, as the error amount, to the discriminating circuit 15, at every constant cycles.

The discriminating circuit 15 includes a register 152 for holding the predetermined threshold value, and a comparator 151 for comparing the error amount received from the counter 173 with the predetermined threshold value held in the register 152, and generating a control signal for controlling the selectors 13 and 14.

When the control signal outputted from the discriminating circuit 15 is "1" indicating that the count value of the counter 173 is larger than the predetermined threshold value, the selectors 13 and 14 select the digital in-phase signal ID outputted from the A/D converter 7 and the digital quadrature signal QD outputted from the A/D converter 8, respectively. When the control signal outputted from the discriminating circuit 15 is "0" indicating that the count value of the counter 173 is not larger than the predetermined threshold value, the selectors 13 and 14 select the in-phase demodulation signal IMD and the quadrature demodulation signal QMD outputted from the waveform equalizer 12, respectively.

When the channel switch-over is conducted so that an abrupt frequency variation occurs, since a code error occurs, the error detection circuit 172 detects the error, and outputs the error detection flag in synchronism with the detected data. The counter 173 counts this flag, and the flag count value of the counter 173 is outputted at every constant cycles to the discriminating circuit 15, and then, is cleared to restart the flag counting from zero.

In the discriminating circuit 15, the comparator 151 compares the count value received from the counter 173 with the predetermined threshold value held in the register 152, and generates the control signal of "1" when the count value of the counter 173 is larger than the predetermined threshold value. Therefore, the selectors 13 and 14 select the digital in-phase signal ID outputted from the A/D converter 7 and the digital quadrature signal QD outputted from the A/D converter 8, respectively, so that a carrier recovery or reproduction loop having a signal distortion but a short delay is constructed, with the result that a quick carrier recovery or reproduction is conducted.

When the loop has become stable and the number of errors detected in the error detection circuit 172 becomes small, the count value of the counter 173 does not become larger than the predetermined threshold value, and therefore, the comparator 151 generates the control signal of "0", so that the selectors 13 and 14 select the in-phase demodulation signal IMD and the quadrature demodulation signal QMD outputted from the waveform equalizer 12, respectively. Thus, a carrier recovery or reproduction loop having a less signal distortion but a large delay is constructed, with the result that a stable carrier recovery or reproduction is conducted.

Here, in order to conduct the error correction, it is necessary to detect a head bit of a series of data. In general, the synchronous signal is inserted at every predetermined bit numbers. It is possible to detect the frequency variation by detecting whether the synchronous signal could be detected.

Figure 5:
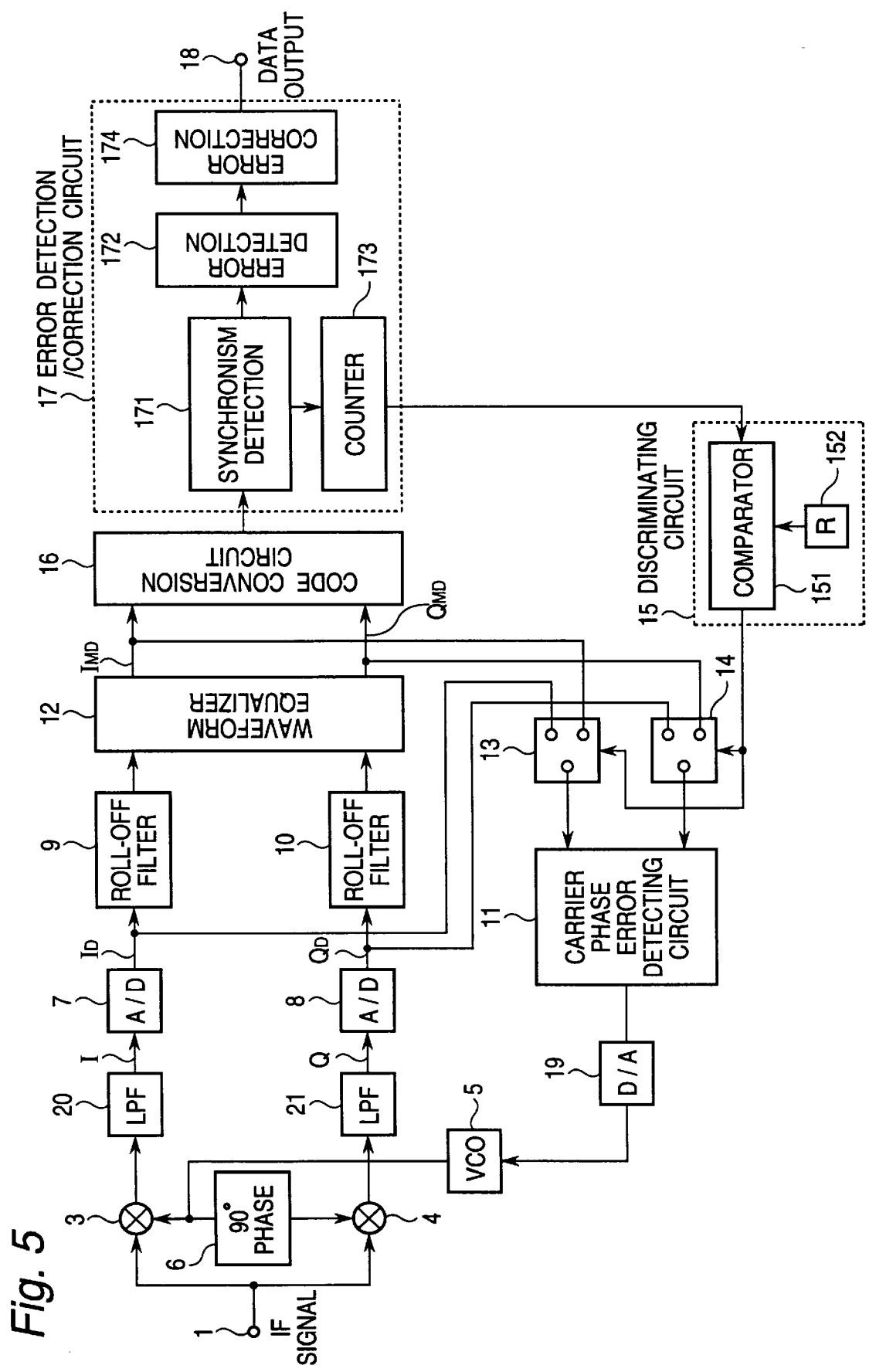
FIG. 5 is a block diagram illustrating a construction of a second embodiment of the multilevel QAM demodulation circuit in accordance with the present invention.

Referring to FIG. 5, there is shown a block diagram illustrating a construction of a second embodiment of the multilevel QAM demodulation circuit in accordance with the present invention, which is configured to discriminate the frequency variation by detecting whether or not the synchronous signal is detected. In FIG. 5, elements similar or corresponding to those shown in FIGS. 3 and 4 are given the same Reference Numerals, and explanation thereof will be omitted for simplification of description.

The second embodiment shown in FIG. 5 is different from the first embodiment shown in FIG. 4 only in that, in the second embodiment shown in FIG. 5, the counter 173 is connected to count the out-of-sync signal generated by the synchronism detecting circuit 171. In the other points, the second embodiment shown in FIG. 5 is the same in construction and in operation as the first embodiment shown in FIG. 4, and therefore, further description will be omitted for simplification of the description.

As seen from the above, the following advantages can be obtained in the multilevel QAM demodulation circuit in accordance with the present invention:

(1) A first advantage is that it is possible to quickly respond to a large frequency variation caused by the channel switch-over and others occurs, so that a stable synchronism can be quickly obtained.

The reason for this is that: The multilevel QAM demodulation circuit in accordance with the present invention is configured to selectively control the carrier reproduction in such a manner that, when the large frequency variation is detected, the carrier reproduction is initially conducted by using the carrier reproduction loop having a small delay, and then, if the reproduced carrier becomes stable at some degree, the carrier reproduction is conducted by using the carrier reproduction loop having a large delay but a less signal distortion.

(2) A second advantage is that the first advantage can be obtained with no substantial increase of the circuit scale.

The reason for this is that: In general, the error detection/correction circuit is indispensable in the cable data transmission, and the synchronism detection is also indispensable to the error detection/correction. Therefore, when the multilevel QAM demodulation circuit in accordance with the present invention is actually applied, the additionally required circuit elements are only the selector, the counter and comparator.

The invention has thus been shown and described with reference to the specific embodiments. However, it should be noted that the present invention is in no way limited to the details of the illustrated structures but changes and modifications may be made within the scope of the appended claims.

I claim:

1. A quadrature demodulation circuit comprising an input terminal receiving a multilevel QAM signal, a local carrier oscillating means for generating a local carrier, a first mixing means multiplying said multilevel QAM signal by said local carrier to generate an analog in-phase signal, a second mixing means multiplying said multilevel QAM signal by a 90° phase-shifted signal of said local carrier to generate an analog quadrature signal, a first A/D converting means receiving said analog in-phase signal for generating a digital in-phase signal, a second A/D converting means receiving said analog quadrature signal for generating a digital quadrature signal, a waveform equalizing means for waveform-equalizing said digital in-phase signal and said digital quadrature signal after conducting a low pass filtering, to generate a digital in-phase demodulated signal and a digital quadrature demodulated signal, a code convening means for code-converting said digital in-phase demodulated signal and said digital quadrature demodulated signal, an error detecting and means for conducting an error detection and correction to an output of said code converting means, and a carrier phase error detecting means generating a digital phase error signal which is supplied through a D/A converting means to said local carrier oscillating means, said carrier phase error detecting means being connected to receive said digital in-phase signal and said digital quadrature signal when a number of out-of-synchronisms detected by said error detecting and correcting means exceeds a predetermined value, and to receive said digital in-phase demodulated signal and said digital quadrature demodulated signal when a number of out-of-synchronisms detected by said error detecting and correcting means does not exceed the predetermined value.

2. A quadrature demodulation circuit comprising an input terminal receiving a multilevel QAM signal, a local carrier oscillating means for generating a local carrier, a first mixing means multiplying said multilevel QAM signal by said local carrier to generate an analog in-phase signal, a second mixing means multiplying said multilevel QAM signal by a 90° phase-shifted signal of said local carrier to generate an analog quadrature signal, a first A/D converting means receiving said analog in-phase signal for generating a digital in-phase signal, a second A/D converting means receiving said analog quadrature signal for generating a digital quadrature signal, a waveform equalizing means for waveform-equalizing said digital in-phase signal and said digital quadrature signal after conducting a low pass filtering, to generate a digital in-phase demodulated signal and a digital quadrature demodulated signal, a code converting means for code-converting said digital in-phase demodulated signal and said digital quadrature demodulated signal, an error detecting and correcting means for conducting an error detection and correcting to an output of said code converting means, and a carrier reproduction control loop for controlling said local carrier oscillating means, said carrier reproduction control loop including a carrier phase error detecting means generating a digital phase error signal, a D/A converting means receiving and converting said digital phase error signal into an analog phase error signal which is fed back to said local carrier oscillating means, and selection means receiving said digital in-phase signal and said digital quadrature signal and said digital in-phase demodulated signal and said digital quadrature demodulated signal, said selection means being controlled on the basis of an output of said error detecting and correcting means to supply said digital in-phase signal and said digital quadrature signal to said carrier phase error detecting means when said output of said error detecting and correcting means indicates a first condition and to supply said digital in-phase demodulated signal and said digital quadrature demodulated signal to said carrier phase error detecting means when said output of said error detecting and correcting means indicates a second condition.

3. A quadrature demodulation circuit claimed in claim 2 wherein when the number of the errors detected by said error detecting and correcting means is larger tan a predetermined value, said selection means supplies said digital in-phase signal and said digital quadrature signal to said carrier phase error detecting means, and when the number of the errors detected by said error detecting and correcting means is not larger than said predetermined value, said selection means supplies said digital in-phase demodulated signal and said digital quadrature demodulated signal to said carrier phase error detecting means.

4. A quadrature demodulation circuit claimed in claim 2, wherein when a number of out-of-synchronisms detected by said error detecting and correcting means is larger than a predetermined value, said selection means supplies said digital in-phase signal and said digital quadrature signal to said carrier phase error detecting means, and when the number of the out-of-syrchronisms detected by said error detecting and correcting means is not larger than said predetermined value, said selection means supplies said digital in-phase demodulated signal and said digital quadrature demodulated signal to said carrier phase error detecting means.

5. A quadrature demodulation circuit comprising an input terminal receiving a multilevel QAM signal, a local carrier oscillating means for generating a local carrier, a first mixing means multiplying said multilevel QAM signal by said local carrier to generate an analog in-phase signal, a second mixing means multiplying said multilevel QAM signal by a 90° phase-shifted signal of said local carrier to generate an analog quadrature signal, a first A/D converting means receiving said analog in-phase signal for generating a digital in-phase signal, a second A/D converting means receiving said analog quadrature signal for generating a digital quadrature signal, a waveform equalizing means for waveform-equalizing said digital in-phase signal and said digital quadrature signal after conducting a low pass filtering, to generate a digital in-phase demodulated signal and a digital quadrature demodulated signal, a code converting means for code-converting said digital in-phase demodulated signal and said digital quadrature demodulated signal, an error detecting and correcting means for conducting an error detection and correction to an output of said code converting means, and a carrier phase error detecting means generating a digital phase error signal which is supplied through a D/A converting means to said local carrier oscillating means, said carrier phase error detecting means being connected to receive said digital in-phase signal and said digital quadrature signal when a number of errors detected by said error detecting and correcting means exceeds a predetermined value, and to receive said digital in-phase demodulated signal and said digital quadrature demodulated signal when a number of errors detected by said error detecting and correcting means does not exceed the predetermined value.

* * * * *